(12) United States Patent
Yamamoto

(10) Patent No.: US 6,360,367 B1
(45) Date of Patent: Mar. 19, 2002

(54) PROGRAM-VIEWING INHIBITION DEVICE

(75) Inventor: Kazuhiko Yamamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/411,855

(22) Filed: Oct. 4, 1999

(30) Foreign Application Priority Data

Oct. 8, 1998 (JP) .......................................... 10-007863

(51) Int. Cl.[7] ................................................ H04N 7/16
(52) U.S. Cl. .............................. 725/25; 725/27; 725/28
(58) Field of Search ............................ 348/5.5, 7, 564; 380/20; 725/25, 27, 28

(56) References Cited

U.S. PATENT DOCUMENTS

| | | | |
|---|---|---|---|
| 4,554,584 A | | 11/1985 | Elarn et al. |
| 4,792,972 A | * | 12/1988 | Cook, Jr. ..................... 380/20 |
| 5,485,518 A | * | 1/1996 | Hunter et al. ................ 348/5.5 |
| 5,583,576 A | * | 12/1996 | Perlman et al. .............. 348/5.5 |
| 5,715,014 A | * | 2/1998 | Perkins et al. ............... 348/565 |
| 5,828,402 A | * | 10/1998 | Collings ...................... 348/5.5 |
| 5,969,748 A | * | 10/1999 | Casement et al. ............. 348/7 |
| 5,973,683 A | * | 11/1999 | Cragun et al. ................ 348/5.5 |
| 5,995,133 A | * | 11/1999 | Kim ............................ 348/5.5 |
| 5,995,160 A | * | 11/1999 | Rumreich .................... 348/564 |
| 6,002,447 A | * | 12/1999 | Rumreich et al. ........... 348/606 |
| 6,020,882 A | * | 2/2000 | Kinghorn et al. ............ 348/5.5 |
| 6,020,910 A | * | 2/2000 | Schmidt et al. .............. 348/5.5 |

* cited by examiner

*Primary Examiner*—Andrew Faile
*Assistant Examiner*—Hai V. Tran
(74) *Attorney, Agent, or Firm*—Lackenbach Siegel Marzullo Aronson & Greenspan, P.C.

(57) ABSTRACT

A program-viewing inhibition device comprises a memory for storing inhibition level data indicative of a predetermined level of unsuitability rating of a broadcasting program, a control section for determining whether or not an input channel received is acceptable by comparing inhibition level data extracted from a broadcast signal of an received input channel with the inhibition level data read out of the memory, and for changing the input channel to another channel when it is judged that the input channel is unacceptable or to be rejected for its viewing. Accordingly, a manual operation to change the input channel to the substitute channel when the input channel is unacceptable for viewing can be eliminated.

15 Claims, 4 Drawing Sheets

PROGRAM-VIEWING INHIBITION DEVICE

BACKGROUND OF THE INVENTION

The present invention relates to a video signal receiving device for receiving TV broadcast electrical signals containing inhibition level data indicative of a level of unsuitability rating of a broadcasting program. More particularly, the invention relates to a program-viewing inhibition device for automatically changing the present program to another program when the present program is judged as unacceptable program by the inhibition level data.

A V-chip system has been proposed to inhibit specific viewers from viewing scenes of violence or sexual programs in various broadcasting systems of terrestrial broadcasting, cable television, satellite broadcasting or the like. In the V-chip system, the broadcasting side adds inhibition level data indicative of a level of unsuitability, rating of a broadcasting program (referred to simply as an inhibition level) to the video signal of each broadcasting program, while the receiving side may set an inhibition level acceptable for viewing programs in advance. Accordingly, the receiving side can watch only the received programs whose the inhibition level is lower than the preset one. Thus, where the V-chip system is employed, the television set, for example, cannot receive those programs whose the inhibition levels are higher than the preset one. In other words, the television programs may be selected in accordance with a situation where the television set is used.

A related receiver set used in the V-chip system is disclosed in U.S. Pat. No. 4,554,584. In this receiving technique (first related art), when receiving a channel to be rejected in its viewing, the receiver blanks the image and sound to inhibit the viewer from watching the program of the received channel. Another related technique is disclosed in Japanese Patent Publication No. 63-125483A. In this technique (second related art), when receiving a channel to be rejected in its viewing or its program having an inhibition level over a preset one (this channel will be referred frequently to as an "undesired or unacceptable channel"), the receiver selects another channel not broadcasted, and presents a white noise screen, to thereby inhibit the viewer from watching the program of the undesired channel.

Those first and second related arts have the following problems to be solved, however. In the first related art, when the television program of the received channel is below an inhibition level preset in the television set, the screen of the television set is blanked and no voice/sound is generated. In the second related art, when the channel to be rejected in its viewing is received, the white noise screen is presented and the speaker generates noise sounds. When the viewer engages in cooking or telephoning, the following inexpedient situations occur. When a television program that has been watched ends, the next program automatically starts, and the next program is unacceptable program, the viewer temporarily stops the cooking or telephoning, and must change the undesired channel to another channel. This channel changing operations are troublesome for the viewer.

SUMMARY OF THE INVENTION

The present invention has been made to solve the problems described above. A first object of the present invention is to provide a program-viewing inhibition device capable of eliminating a manual channel changing operation when an undesired program having an inhibition level over a preset one is received.

A second object of the present invention is to provide a program-viewing inhibition device in which a reception of an acceptable program is ensured when an undesired program is received.

A third object of the present invention is to provide a program-viewing inhibition device in which a chance of selecting an acceptable program is lessened when an undesired program is received.

A fourth object of the present invention is to provide a program-viewing inhibition device capable of showing that a channel currently received is different from the designated one when a channel is changed to another channel for avoiding the reception of an undesired program.

A fifth object of the present invention is to provide a program-viewing inhibition device capable of eliminating an additional use of the display device for indicating a change of channel.

A sixth object of the present invention is to provide a program-viewing inhibition device in which an operation of returning the changed channel to the input channel is not required when a program of the input channel becomes an acceptable program.

A seventh object of the present invention is to provide a program-viewing inhibition device in which a viewer can judge whether the changed channel is returned to the input channel when a program of the input channel becomes an acceptable program.

In order to achieve the above objects, there is provided a program-viewing inhibition device comprising:

an input section for inputting data indicative of a channel to be received;

a receiving section for receiving a broadcast signal of a channel inputted by the input section and for converting the broadcast signal into a display signal, the broadcast signal including first inhibition level data indicative of a level of unsuitability rating of a program thereof;

level storage means for storing second inhibition level data indicative of a preset level of unsuitability rating of a program to be inhibited;

judgement means for judging whether the inhibition level of the first inhibition level data exceeds the inhibition level of the second inhibition level data; and channel control means for causing the receiving section to receive a broadcast signal of a substitute channel in place of the inputted channel when the inhibition level of the first inhibition level data exceeds the inhibition level of the second inhibition level data.

With this configuration, when the received channel is unacceptable or to be rejected for its viewing, the receiving channel is automatically changed to another channel. Accordingly, in this state, a program to be acceptable is received. Therefore, when the received channel is unacceptable, there is no need of any manual operation to change the receiving channel to another channel.

In the device, the substitute channel is selected from a group of channels receivable by the receiving section.

With this configuration, when a received channel is unacceptable, it is changed to one of the channels of the of "receivable channel group". Accordingly, when the received channel is unacceptable, there is no need of any manual operation to change the receiving channel to another channel.

In this device, the broadcast signal of the substitute channel includes third inhibition level data indicative of a level of unsuitability rating of a program thereof, and the substitute channel having the third inhibition level data the inhibition level of which is lower than the inhibition level of the second inhibition level data is searched in a predetermined order.

Accordingly, when an unacceptable channel is received, the channel control means continues the channel changing till an acceptable channel is received. Therefore, an acceptable channel can reliably be received.

The device further comprises channel storage means for storing substitute channel data indicative of a preset substitute channel to be selected. The channel control section selects the substitute channel stored in the channel storage means when the inhibition level of the first inhibition level data exceeds the inhibition level of the second inhibition level data.

Accordingly, a channel having less chance that it will be unacceptable may be received by merely selecting those channels which transmit broadcasting programs having no or less chance of exceeding the predetermined unsuitability rating level for the channels to be received. Accordingly, when an unacceptable channel is received, the receiving channel can reliably be changed to a channel having a less chance that it will be unacceptable.

The device further comprises display means for indicating the channel change according to the program-viewing inhibition.

Accordingly, when the input channel is changed to another channel since the former is unacceptable, the change of the channel is displayed. Accordingly, the video signal receiving device informs the viewer that the receiving channel is different from the designated one.

In the device, the display means superposes a message indicating the channel change according to the program-viewing inhibition onto the display signal.

Accordingly, a message is displayed by a display device which displays a receiving image. And hence there is no need of using an additional display device.

In the device, the receiving section includes a first receiving circuit and a second receiving circuit, the device further comprises:

auxiliary channel control means for causing the second receiving circuit to receive the inputted channel when the first receiving circuit is caused to receive the substitute channel; and auxiliary judgement means for judging whether the inhibition level of the first inhibition level exceeds the inhibition level of the second inhibition level data when the first receiving circuit is caused to receive the substitute channel. The judgement means continues to judge the inhibition level of the third inhibition level data exceeds the inhibition level of the second inhibition level data when the first receiving circuit is caused to receive the substitute channel.

With this confiruraation, the device can properly respond to a case where the unacceptable state is changed after the first channel change.

In the device, the auxiliary channel control means causes the receiving section to output a signal derived from the second receiving circuit as the display signal when the auxiliary judgement means judges that the inhibit level of the first inhibition level data is lower than the inhibition level of the second inhibition level data.

With this confituration, in a case where the unacceptable state of the input channel is removed during the reception of the changed channel, the receiving channel is automatically changed from the changed channel to the input channel. Accordingly, when the unacceptable state of the input channel is removed, no operation to return the changed channel to the input channel is required.

The device further comprises auxiliary display means for causing the receiving section to output a signal derived from the first receiving circuit as the display signal when the auxiliary judgement means judges that the inhibit level of the first inhibition level data is lower than the inhibition level of the second inhibition level data, and for superposing a message indicating that the input channel is not inhibited from viewing onto the display signal. The auxiliary channel control means causes the receiving section to output a signal derived from the second receiving circuit as the display signal when an instruction for returning to the inputted channel is inputted to the input section in response to the message superposed by the auxiliary display means.

With this configuration, in a case where the unacceptable state of the input channel is removed during the reception of the changed channel, a message that the input channel is now acceptable is visually presented. In this state, when the input portion is operated, the receiving channel is changed to the input channel, while when it is not operated, the changed channel reception continues. Accordingly, when the unacceptable state of the input channel is removed, it is possible to judge whether or not the present channel is to be changed to the input channel.

DETAILED DESCRIPTION OF THE PREFERRED EMBODIMENTS

The preferred embodiments of the present invention will be described with reference to the accompanying drawings.

Figure 4:
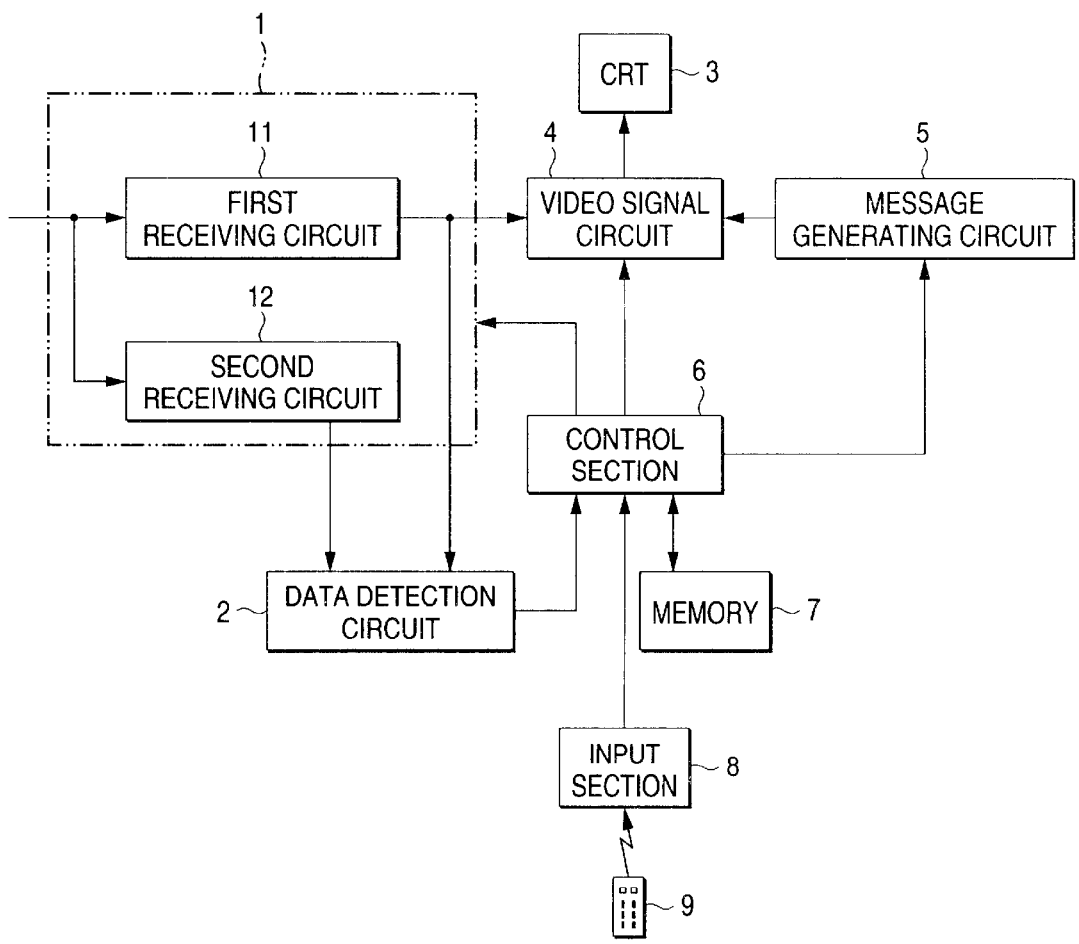
FIG. 4 is a block diagram showing an electrical configuration of a television set into which the program-viewing inhibition device according to the present invention is incorporated.

FIG. 4 is a block diagram showing an electrical configuration of a television set into which a program-viewing inhibition device according to the present invention is incorporated. In the description to follow, a channel input to an input section 8 will be referred to as an "input channel". When a program of the input channel does not satisfy a preset inhibition level or it is an undesired or unacceptable, and the program-viewing inhibition device changes the input channel to another channel, this channel will be a "substitute channel". An aggregation of channels receivable by the television set will be referred to as a "receivable channel group".

A first receiving circuit 11 and a second receiving circuit 12 constitute a receiving circuit section 1. A circuit arrangement of the first receiving circuit 11 is substantially the same as of the second receiving circuit 12. Each first receiving circuit includes a tuner, an IF amplifier circuit, a detector circuit, and the like. The receiving circuit section 1 is capable of receiving television signals in the VHF and UHF bands. The television signal contain inhibition level data indicative of a level of unsuitability ranting of a broadcasting program. The first receiving circuit 11 converts the frequency of received television signals, amplifies the resultant, and video-detects the same into a video signal. The level data is superposed on a video signal during a given horizontal scan period during a vertical blanking period.

A video signal circuit 4 receives a video signal from the first receiving circuit 11 and processes it into a video signal suitable for driving a CRT 3 for its display. Further, it superposes a message signal from a message generating circuit 5 on the video signal processed for CRT display. A data detection circuit 2 extracts level data from the video signal from the first receiving circuit 11 and the video signal from the second receiving circuit 12. Further, it sends the extracted level data to a control section 6. The message generating circuit 5 generates a message describing that the input channel has been changed to the substitute channel since the former is an undesired program, and another message describing that the input channel has become an acceptable program, and sends those messages to the video signal circuit 4.

The input section 8 includes a receiving circuit for receiving a signal from an operation panel having a plurality of keys or a remote controller 9, which contains data indicative of receiving channel (input channel), inhibition level, and a channel in place of an undesired channel. A memory 7 includes an inhibition level storage section and a channel storage section, and stores the inhibition level data and channel data inputted by the viewer.

The control section 6 mainly includes a software to be executed by a micro computer, and controls channels received by the first receiving circuit 11 and the second receiving circuit 12. Further, it stores inhibition level data, which is indicative of a criterion to determine as to whether or not the received program is to be accepted or rejected, into the memory 7. Further, it stores into the memory 7 the data which is received through the input section 8 and represents a substitute channel to be received when the input channel is undesirable.

The control section 6 serves as inhibition level judgement means and channel control means of the present invention, and when it cooperates with the message generating circuit 5, it also serves as display means. Therefore, when an input channel is received by the first receiving circuit 11, the control section 6 compares the inhibition level data derived from the data detection circuit 2 with the inhibition level data stored in the memory 7 in order to judge whether the input channel is undesired. If the input channel is an undesired channel, it changes the channel to be received by the first receiving circuit 11 to a substitute channel. When the substitute channel is an acceptable channel, it guides a video signal from the first receiving circuit 11 to the video signal circuit 4, and the video signal circuit 4 processes the received video signal into a video signal suitable for driving the CRT 3, and the CRT 3 displays the video signal. At this time, the control section 6 causes the CRT 3 to display a message that the input channel is changed to the substitute channel because the former is an unacceptable program, by controlling the message generating circuit 5.

The control section 6 also serves as auxiliary channel control means and auxiliary judgement means of the present invention. Further, it serves as auxiliary display means when it cooperates with the message generating circuit 5. When the first receiving circuit 11 receives a substitute channel, the thus functioning control section 6 causes the second receiving circuit 12 to receive an input channel concurrently, and judges whether or not the input channel is still unacceptable. When the inhibition level of the input channel becomes lowers than the preset one, the control section 6 changes the channel received by the first receiving circuit 11 from the substitute channel to the input channel, and allows a video signal of the input channel received to go to the video signal circuit 4. In turn, the video signal circuit 4 processes the video signal into a video signal suitable for its visual representation by the CRT 3, and then the CRT 3 displays the video signal. Alternatively, when the inhibition level of the input channel becomes lower than the preset one, the control section 6 allows a video signal of the substitute channel to go to the video signal circuit 4. In turn, the video signal circuit 4 processes the video signal of the substitute channel into a video signal suitable for its visual representation by the CRT 3, and then the CRT 3 displays the video signal, while at the same time displays a message that the input channel is acceptable. When an instruction to change the receiving channel to the input channel is issued, the control section 6 causes the first receiving circuit 11 to receive the input channel and the CRT 3 to display the same.

Figure 1:
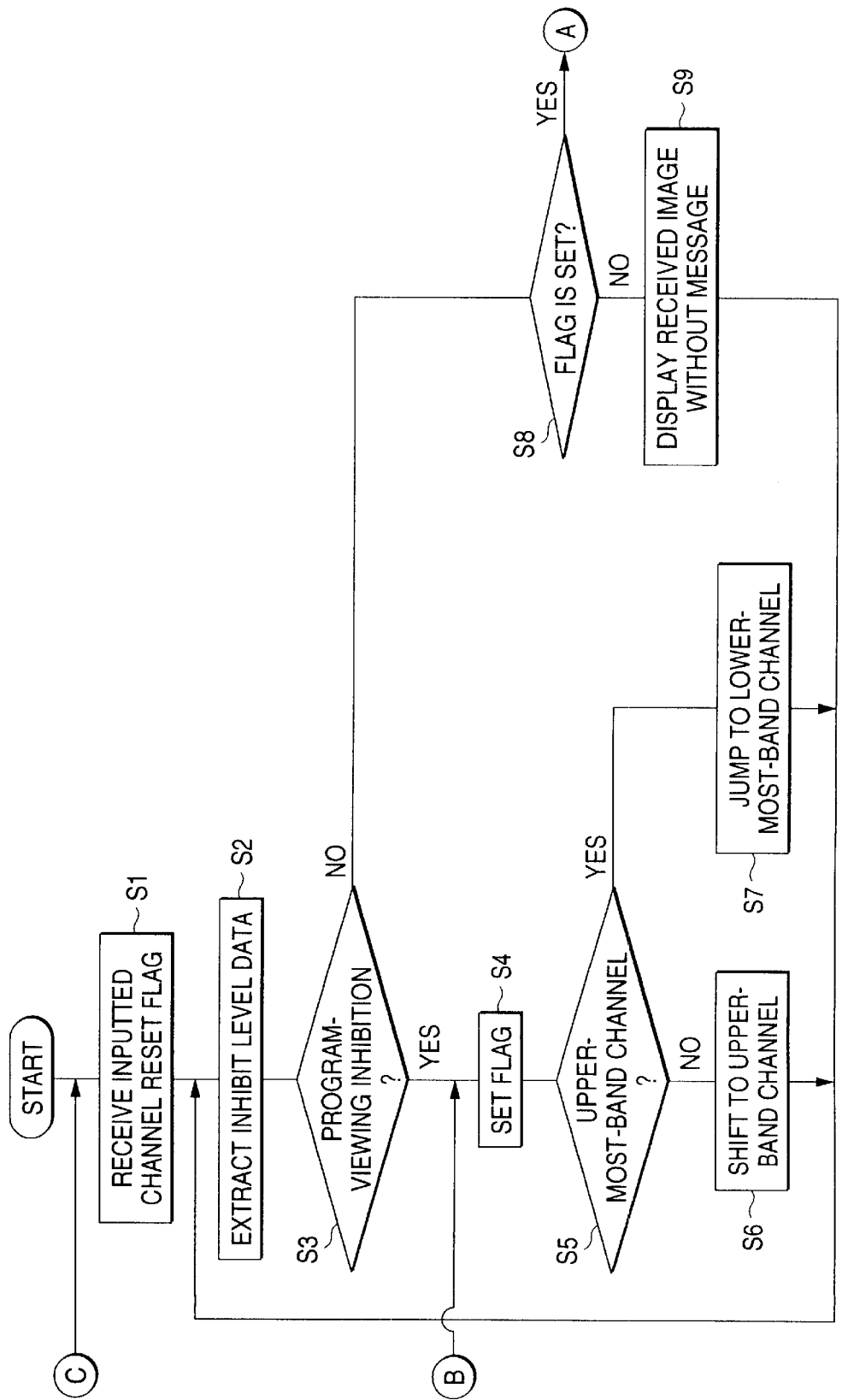
FIG. 1 is a flow chart showing a main operation in a first operation mode of a program-viewing inhibition device according to the present invention.
Figure 2:
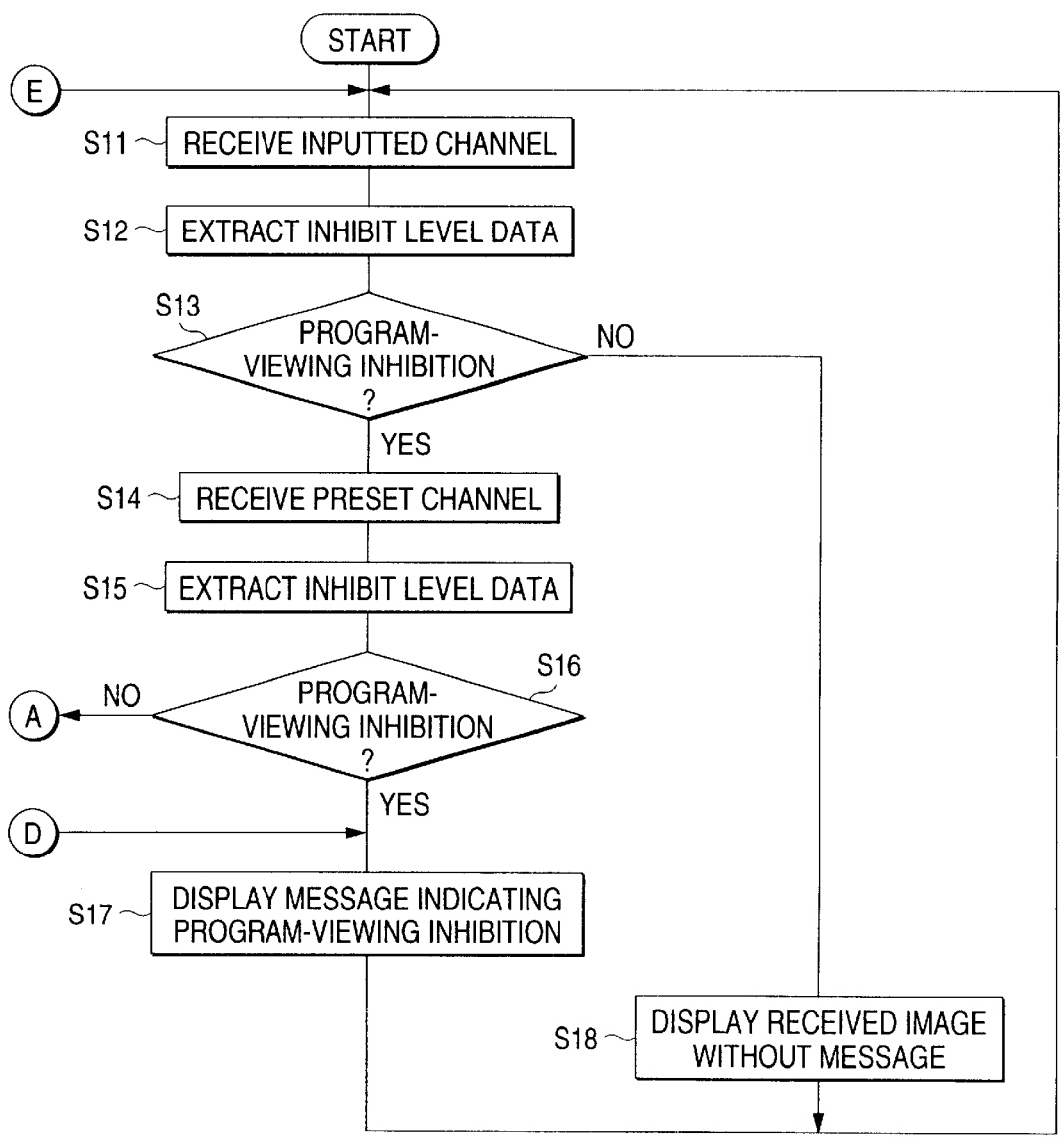
FIG. 2 is a flow chart showing a main operation in a second operation mode of the program-viewing inhibition device.
Figure 3:
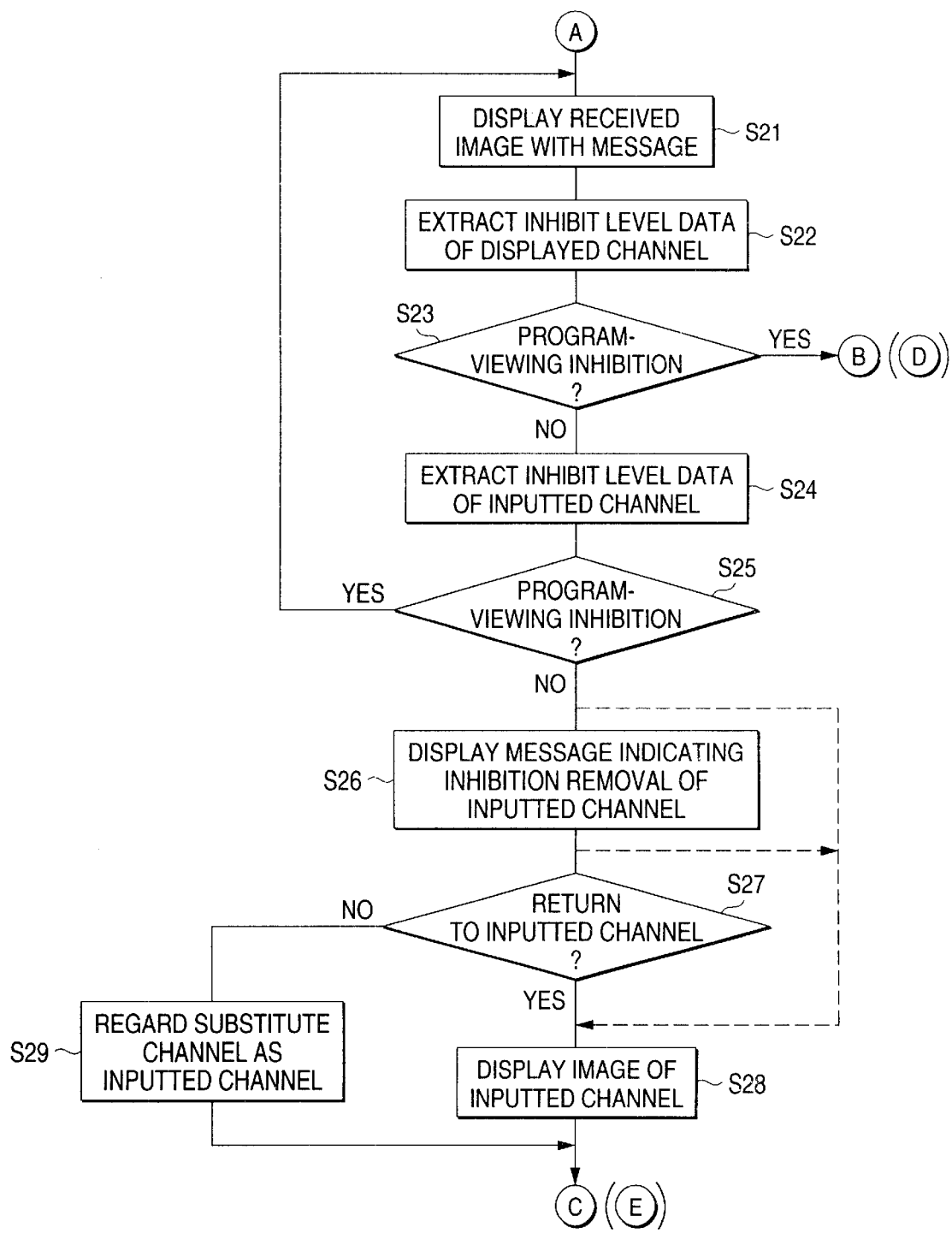
FIG. 3 is a flow chart showing a main operation common to the first and second operation modes of the program-viewing inhibition device.

Operations of the program-viewing inhibition device thus constructed will be described while referring mainly to FIGS. 1 through 3. FIG. 1 is a flow chart showing a flow of a process carried out in the program-viewing inhibition device when a first operation mode is set up in the device. FIG. 2 is a flow chart showing a flow of a process carried out in the program-viewing inhibition device when a second operation mode is set up in the device. FIG. 3 is a flow chart showing a flow of a process carried out in the program-viewing inhibition device, which the process is common to the first and second operation modes. The reference characters within brackets indicate flow destinations in a case where the second operation mode is set up.

An initial setting is first performed. To the initial setting, an operator enters inhibition level data indicative of a predetermined inhibition level and a substitute channel to be received when an input channel received exceeds the predetermined inhibition level by operating related keys of the input section 8 or the remote controller 9. (The channels which transmit broadcasting programs having no or less chance of exceeding the predetermined inhibition level, such as a channel by a national broadcasting station, are selected for the channels to be received.)

The inhibition level data and the substitute channel data, which are thus entered, are stored into the memory 7 under control of the control section 6. Following the initial setting, the operator operates the remote controller 9 to select an operation mode of the program-viewing inhibition device; the first mode or the second mode. It is assumed that the first operation mode is selected.

The remote controller 9 is operated to cause the television set with the program-viewing inhibition device incorporated therein to receive a channel. The controller resets a flag indicative of a predetermined inhibition level (step S1). The data detection circuit 2 extracts inhibition level data (indicative of a inhibition level of the received program) from a television signal received by the first receiving circuit 11, and transfers the extracted inhibition level data to the control section 6 (step S2). Upon receipt of the extracted inhibition level data, the control section 6 compares the inhibition level data with the inhibition level data stored in and read out of the memory 7 to check whether or not a program transmitted through the channel being received exceeds the predetermined inhibition level (step S3).

If an inhibition level of the extracted inhibition level data exceeds the predetermined inhibition level of the stored inhibition level, the control section 6 sets a flag indicative of the program-viewing inhibition (step S4). Thereafter, the control section 6 checks if the channel under reception is the uppermost-band channel in the receivable channel group (step S5). If it is not the uppermost-band channel, the controller causes the first receiving circuit 11 to receive an adjacent band channel upper than the present channel (step S6).

The control section 6 then returns to the step S2, and it instructs the data detection circuit 2 to extract inhibition level data from a television signal of the substitute channel, and the data detection circuit 2 transfers the extracted inhibition level data to the control section 6. Upon receipt of the extracted inhibition level data, the control section 6 compares the extracted inhibition level data with the level data derived from the memory 7 to check whether or not the former exceeds the latter (step S3).

If the check result shows that the extracted inhibition level data exceeds the stored inhibition level data in the inhibition level, viz., the channel under reception is to be rejected in its viewing, the controller repeats a loop of process steps S4 to S6 and S2 to S3. In the step S5, if the channel being received belongs to the uppermost-band channel, the controller sets the receiving channel to the lowermost-band channel (step S7).

Figure 5:
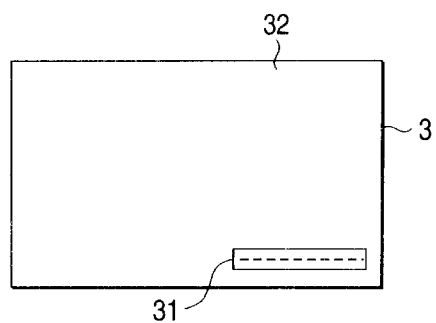
FIG. 5 shows an example of a screen of the television set when a receiving channel is changed to a substitute channel according to the program-viewing inhibition.

During the repeating of executing the process step loop, if the receiving channel is acceptable (step S3), the controller jumps its control from the step S3 to a step S8, and in the step S8, the controller checks if the flag is set. At this time, the flag has been set, and therefore, the controller goes to a step S21 (FIG. 3). The control section 6 causes the video signal circuit 4 to receive a video signal from the first receiving circuit 11, and to process the same into a video signal suitable for driving the CRT 3, and in turn the CRT 3 displays the video signal. At the same time, the control section 6 causes the message generating circuit 5 to output a message signal for transfer to the video signal circuit 4, and upon receipt of the message signal, the video signal circuit 4 superposes the message signal on the received video signal. As shown in FIG. 5, the CRT 3 displays a receiving image 32 and a message 31 that the input channel has been changed to another (for example, "Selected channel is unsuitable for the viewing and another channel is under reception.").

To prepare for a situation where the substitute channel may become an undesired or rejected channel, the control section 6 compares the inhibition level data extracted from a television signal received by the first receiving circuit 11 with the inhibition level data read out of the memory 7, and checks if the former exceeds the latter in the inhibition level (steps S22 and S23 in FIG. 3). If the program of the substitute channel is not the rejected one, the controller causes the second receiving circuit 12 to receive the input channel, and judges whether or not the rejection of the input channel continues (steps S24 and S25). If the substitute channel is not rejected and the rejection of the input channel continues, the steps S21 to S25 are repeatedly continued. In this state, the CRT 3 displays a received image 32 of the substitute channel and a message 31 of the channel changing.

When the undesirable program of the input channel becomes an acceptable program during the execution of the process step loop, the controller executes a step S26 following the step S25. In this step, the controller changes the viewing rejection message to such a message that the input channel program has been acceptable in its viewing. When the input channel is a 6-channel, for example, the changed message is "6-channel is viewable now.", for example. When the user operates the remote controller 9 to select the 6-channel after viewing the message, the control section 6 causes the first receiving circuit 11 to receive the input channel. Subsequently, a video signal (of the input channel) from the first receiving circuit 11 is led to the video signal circuit 4, and is displayed by the CRT 3 (steps S27, S28).

Alternatively, the following process may be used: when the input channel is now acceptable, the first receiving circuit 11 receives the input channel, the video signal circuit 4 processes a television signal from the first receiving circuit 11 into a television signal suitable for its driving the CRT 3, and the CRT 3 displays the television signal. (As indicated by a dashed line in FIG. 3, the control jumps from the step S25 to a step S28, as set forth in claim 7). In another alternative, when the input channel is now acceptable, the controller causes the CRT 3 to display for a while a message describing that the input channel is now acceptable, and shifts its control to the step S28. (As indicated by a dashed line, the step S26 is jumped to the step S28.) This alternative eliminates an abrupt and unnatural changing of the channel.

During a period that no instruction is entered into the input section 8 (step S27), the controller returns to the step S21 (not shown). When an instruction to continue the reception of the substitute channel (not to return to the input channel) is entered in the step S21, the controller subsequently performs the control process on the assumption that the substitute channel is the input channel (step S29).

Description to follow is elaboration of an operation of the program-viewing inhibition device when a program entered by the remote controller 9 is acceptable. The control section 6 causes the first receiving circuit 11 to receive an input channel (step S1). The data detection circuit 2 extracts inhibition level data from a television signal of the input channel received by the first receiving circuit 11 and transfers it to the control section 6 (step S2). The control section 6 compares the extracted inhibition level data with the inhibition level data read out of the memory 7 to check whether or not the received program is acceptable (step S3).

Since the check result is that the input channel is acceptable, the controller jumps from the step S3 to the step S8, and checks a state of the flag. At this time, the flag has been reset, and the controller goes to the step S9. The control section 6 causes the video signal circuit 4 to process a video signal from the first receiving circuit 11 into a video signal suitable for visual representation by the CRT 3, and in turn the CRT 3 displays the video signal. In this case, the receiving image 32 displays only an receiving image 32 without a message 31. To prepare a situation where the program is changed to be an unacceptable program during the image being displayed, the controller 6 repeats the judgement process starting at the step S2. When the remote controller 9 is operated and an input channel is input to the television set during the above operation, the controller starts again the control process from the step S1.

The program-viewing inhibition device of the invention operates as described above when it is placed in the first operation mode. Now, an operation of the program-viewing inhibition device when it is placed in the second operation mode will be described.

When the remote controller 9 is operated to designate an input channel, the control section 6 causes the first receiving circuit 11 to receive the input channel (step S11, FIG. 3). The data detection circuit 2 extracts inhibition level data from a television signal received by the first receiving circuit 11, and transfers it to the control section 6 (step S12). The control section 6 compares the extracted inhibition level data with the inhibition level data read out of the memory 7 to check whether or not a program of the received program is acceptable (step S13).

When the check result shows that the input channel is unacceptable or to be rejected, the control section 6 causes the first receiving circuit 11 to receive a channel, which was stored in advance in the memory 7 (step S14). The data detection circuit 2 extracts level data from the video signal received by the first receiving circuit 11 and transfers it to the control section 6 (step S15). The control section 6 compares the extracted inhibition level data with the inhibition level data read out of the memory 7 to check whether or not a program of the received channel is acceptable (step S16).

When the received channel is acceptable, the controller skips from the step S16 to the step S21. The control section 6 causes the video signal circuit 4 to process a video signal from the first receiving circuit 11 into a video signal suitable for visual representation by the CRT 3, and in turn the CRT 3 displays a message. At this time, a receiving image 32 and a message 31 describing that the channel has been changed to another are displayed on the screen of the CRT 3.

Subsequently, operations similar to those mentioned above are repeated. When the viewing of the input channel continues, a process loop from the steps S21 to S25 is carried out. When the input channel becomes an acceptable channel, the message on the CRT screen changes its contents and describes that the input channel is now acceptable. When an instruction to return the channel to the input channel is entered, an image of the input channel is displayed on the screen of the CRT 3. (When the input channel becomes an acceptable channel, the input channel image is displayed on the screen of the CRT 3 immediately or after the message is displayed for a preset time.)

There is a case where some channel preset is judged to be unacceptable by the step S16. In this case, the control section 6 shifts to a step S17 to cause the CRT 3 to display only a message describing that the preset channel is to be rejected in its viewing. To prepare for a situation that during the display of the message by the step S17, the program changes to a program to be acceptable, the judgement process starting at the step S11 is repeated. When blocking of viewing the program of the input channel or the program of the preset channel is removed, a receiving image is immediately displayed. When the remote controller 9 is operated during the above operation and an input channel is input the television set, the control process starts again from the step S11.

When the program of the channel entered by the remote controller 9 is acceptable, the step S18 is carried out after the judgement operation of the step S18. The control section 6 causes the video signal circuit 4 to process the video signal from the first receiving circuit 11 into a video signal capable of driving the CRT 3, and the CRT 3 displays the program. At this time, the CRT 3 displays only the receiving image 32, without the message 31.

There is a chance that the program changes to be unacceptable during the display of the receiving image (by the step S18). In preparation for this, the judging operation starting from the step S11 is repeated. When the remote controller 9 is operated and an input channel is received during the above operation, the operation starts again from the step S11.

It is evident that the present invention is not limited to the above mentioned embodiment. In the embodiment described above, the channel is changed to the upper-band channel in the step S6. It may be changed to the lower-band channel, as a matter of course (in this case, the step S5 checks if the channel is the lowermost-band channel).

In the embodiment, the video signal device for receiving television signals containing level data indicative of a level of unsuitability rating is the television set with the CRT 3 for video signal visual representation. It is readily understood that the invention is applicable to a video signal receiving circuit which produces received television signals as video signals, such as a receiving circuit of a video cassette deck.

The television broadcasting from which television signals are received by the program-viewing inhibition device may be any or a combination of satellite broadcasting, cable broadcasting, terrestrial broadcasting and others.

What is claimed is:

1. A program-viewing inhibition device comprising:
   an input section for inputting data indicative of a channel to be received;
   a receiving section for receiving a broadcast signal of a channel inputted by the input section and for converting the broadcast signal into a display signal, the broadcast signal including the first inhibition level data indicative of a level of unsuitability rating of a program thereof;
   level storage means for storing second inhibition level data indicative of a present level of unsuitability rating of a program to be inhibited;
   judgment means for judging whether the inhibition level of the first inhibition level data exceeds the inhibition level of the second inhibition level data;
   channel control means for causing the receiving section to receive a broadcast signal of a substitute channel independently from a channel selecting operation of a view when the inhibition level of the first inhibition level data exceeds the inhibition level of the second inhibition level data; and
   channel storage means for storing substitute channel data indicative of a user-selected preset substitute channel to be selected;
   wherein the channel control section selects the substitute channel stored in the channel storage means when the inhibition level data exceeds the inhibition level of the second inhibition data.

2. The program-viewing inhibition device as set forth in claim 1, wherein the substitute channel is selected from a group of channels receivable by the receiving section.

3. The program-viewing inhibition device as set forth in claim 1, wherein the broadcast signal of the substitute channel includes third inhibition level data indicative of a level of unsuitability rating of a program thereof, and
   wherein the substitute channel having the third inhibition level data the inhibition level of which is lower than the inhibition level of the second inhibition level data is searched in a predetermined order.

4. The program-viewing inhibition device as set forth in claim 1, further comprising:
   display means for indicating the channel change according to the program-viewing inhibition.

5. The program-viewing inhibition device as set forth in claim 4, wherein the display means superposes a message indicating the channel change according to the program-viewing inhibition onto the display signal.

6. A program-viewing inhibition device comprising:

an input section for inputting data indicative of a channel to be received;

a receiving section for receiving a broadcast signal of a channel inputted by the input section and for converting the broadcast signal into a display signal, the broadcast signal including first inhibition level data indicative of a level of unsuitability rating of a program thereof;

level storage means for storing second inhibition level data indicative of a preset level of unsuitability rating of a program to be inhibited;

judgment means for judging whether the inhibition level of the first inhibition level data exceeds the inhibition level of the second inhibition level data; and channel control means for causing the receiving section to receive a broadcast signal of a substitute channel in place of the inputted channel when the inhibition level of the first inhibition level data exceeds the inhibition level of the second inhibition level data, channel storage means for storing substitute channel data indicative of a user-selected preset substitute channel to be selected;

wherein the channel control section selects the substitute channel stored in the channel storage means when the inhibition level data exceeds the inhibition level of the second inhibition data, the broadcast signal of the substitute channel including a third inhibition level data indicative of a level of unsuitability rating of a program thereof, wherein the substitute channel having third inhibition level data the inhibition level of which is lower than the inhibition level of the second inhibition level data is searched in a predetermined order, the receiving section including a first receiving circuit and a second receiving circuit, the device further comprising:

auxiliary channel control means causing the second receiving circuit to receive the inputted channel when the first receiving circuit is caused to receive the substitute channel;

auxiliary judgment means for judging whether the inhibition level of the first inhibition level exceeds the inhibition level of the second inhibition level data when the first receiving circuit is caused to receive the substitute channel; and wherein the judgment means continues to judge the inhibition level of the third inhibition level data exceeds the inhibition level of the second inhibition level data when the first receiving circuit is caused to receive the substitute channel.

7. The program-viewing inhibition device as set forth in claim 6, wherein the auxiliary channel control means causing the receiving section to output a signal derived from the second receiving circuit as the display signal when the auxiliary judgment means judges that the inhibition level of the first inhibition level data is lower than the inhibition level of the second inhibition level data.

8. The program-viewing inhibition device as set forth in claim 6, further comprising:

auxiliary display means for causing the receiving section to output a signal derived from the first receiving circuit as the display signal when the auxiliary judgment means judges that the inhibition level of the first inhibition level data is lower than the inhibition level of the second inhibition level data, and for superimposing a message indicating that the input channel is not inhibited from viewing onto the display signal, wherein the auxiliary channel control means causes the receiving section to output a signal derived from the second receiving circuit as the display signal when an instruction for returning to the inputted channel is inputted to the input section in response to the message superimposed by the auxiliary display means.

9. A program-viewing inhibition device comprising:

an input section for inputting data indicative of a channel to be received;

an a receiving section for receiving a broadcast signal of a channel inputted by the input section and for converting the broadcast signal into a display signal, the broadcast signal including first inhibition level data indicative of a level of unsuitability rating of a program thereof;

level storage means for storing second inhibition data indicative of a preset level of unsuitability rating of a program to be inhibited;

judgment means for judging whether the inhibition level of the first inhibition level data exceeds the inhibition level of the second inhibition level data; and channel control means for causing the receiving section to receive a broadcast signal of a substitute channel in place of the inputted channel when the inhibition level of the first inhibition level data exceeds the inhibition level of the second inhibition level data, wherein the broadcast signal of the substitute channel includes third inhibition level data indicative of a level of unsuitability rating of a program thereof;

wherein the substitute channel having the third inhibition level data the inhibition level of which is lower than the inhibition level of the second inhibition level data is searched in a predetermined order;

wherein the receiving section includes a first receiving circuit and a second receiving circuit, the device further comprises:

auxiliary channel control means for causing the second receiving circuit to receive the inputted channel when the first receiving circuit is caused to receive the substitute channel; and auxiliary judgment means for judging whether the inhibition level of the first inhibition level exceeds the inhibition level of the second inhibition level data when the first receiving circuit is caused to receive the substitute channel.

10. The program-viewing device as set forth in claim 9, wherein the substitute channel is selected from a group of channels receivable by the receiving station.

11. The program-viewing device as set forth in claim 9, further comprising:

channel storage means for storing substitute channel data indicative of a preset substitute channel to be selected, wherein the channel control section selects the substitute channel stored in the channel storage means when the inhibition level of the first inhibition level data exceeds the inhibition level of the second inhibition level data.

12. The program-viewing device as set forth in claim 9, further comprising:

display means for indicating the channel change according to the program-viewing inhibition.

13. The program-viewing inhibition device as set forth in claim 12, wherein the display means superimposes a message indicating the channel change according to the program-viewing inhibition onto the display signal.

14. The program-viewing inhibition device as set forth in claim 9, wherein the auxiliary channel control means causes the receiving section to output a signal derived from the second receiving circuit as the display signal when the auxiliary judgment means judges that the inhibition level of the first inhibition level data is lower than the inhibition level of the second inhibition level data.

15. The program-viewing inhibition device as set forth in claim 9, further comprising:

auxiliary display means for causing receiving section to output a signal derived from the first receiving circuit at the display signal when the auxiliary judgment means judges that the inhibition level of the first inhibition level data is lower than the inhibition level of the second inhibition level data, and for superimposing a message indicating that the input channel is not inhibited for viewing onto the display signal, wherein the auxiliary channel control means causes the receiving section to output a signal derived from the second receiving circuit as the display signal when an instruction for returning to the inputted channel is inputted to the input section in response to the message superimposed by the auxiliary display means.

\* \* \* \* \*